United States Patent
Newman

(10) Patent No.: US 12,515,757 B2
(45) Date of Patent: Jan. 6, 2026

(54) BICYCLE CABLE-WRAP PREVENTION DEVICE

(71) Applicant: Jonathan Newman, Havertown, PA (US)

(72) Inventor: Jonathan Newman, Havertown, PA (US)

( * ) Notice: Subject to any disclaimer, the term of this patent is extended or adjusted under 35 U.S.C. 154(b) by 554 days.

(21) Appl. No.: 17/983,969

(22) Filed: Nov. 9, 2022

(65) Prior Publication Data
US 2024/0149971 A1    May 9, 2024

(51) Int. Cl.
B62K 21/10    (2006.01)

(52) U.S. Cl.
CPC .................. B62K 21/10 (2013.01)

(58) Field of Classification Search
CPC .......... B62K 21/10; B62K 21/02; B62J 11/13
See application file for complete search history.

(56) References Cited

U.S. PATENT DOCUMENTS

| | | | | |
|---|---|---|---|---|
| 516,115 A * | 3/1894 | Roberts | .................. | B62K 21/08 280/272 |
| 582,279 A * | 5/1897 | Gold | ...................... | B62K 21/08 280/272 |
| 591,930 A * | 10/1897 | Plummer | ............... | B62K 21/10 280/271 |
| 2,415,735 A * | 2/1947 | Fastborg | .................. | B62H 5/06 74/495 |
| 4,288,089 A * | 9/1981 | Thiessen | ................ | B62K 13/06 280/209 |
| 4,887,827 A | 12/1989 | Heggie | | |
| 4,889,710 A * | 12/1989 | Hagarty | ............... | A01N 25/006 424/45 |
| 5,178,033 A * | 1/1993 | Kund | ....................... | B62J 11/13 74/489 |
| 5,259,638 A * | 11/1993 | Krauss | ..................... | B62H 7/00 280/293 |
| 5,445,047 A * | 8/1995 | Chi | ......................... | B62J 11/13 384/537 |
| 5,492,033 A * | 2/1996 | Hopey | ................... | B62K 21/08 280/272 |
| 6,003,890 A | 12/1999 | Inouye | | |
| 6,631,915 B2 | 10/2003 | Barefoot | | |
| 8,262,292 B2 * | 9/2012 | Hsieh | ..................... | B62K 21/06 384/537 |
| 8,696,007 B2 | 4/2014 | Jankura | | |
| 9,475,539 B2 | 10/2016 | Ehrhard | | |
| 9,862,450 B2 * | 1/2018 | Meggiolan | ............ | B62K 21/12 |
| 10,065,695 B1 | 9/2018 | Melcher | | |
| 2007/0160364 A1* | 7/2007 | Peika | ..................... | F16M 13/02 396/428 |

(Continued)

FOREIGN PATENT DOCUMENTS

DE              892722 C   * 10/1953   ............... B62H 5/06

*Primary Examiner* — Minnah L Seoh
(74) *Attorney, Agent, or Firm* — Edison Law Group; Jerome Drabiak; Anthony Bacon

(57) ABSTRACT

A device attachable to a bicycle to prevent cables of the bicycle from wrapping around a steering tube is disclosed. The device includes an arm secured to a steering tube of the bicycle. The device includes a stop attached to the arm, to permit rotation of the steering tube about an axis of rotation relative to a head tube only between a first position and a second position.

8 Claims, 3 Drawing Sheets

(56) References Cited

U.S. PATENT DOCUMENTS

| | | | |
|---|---|---|---|
| 2007/0182123 A1* | 8/2007 | Bryant | B62K 3/002 |
| | | | 280/271 |
| 2014/0084563 A1* | 3/2014 | Ehrhard | B62K 21/00 |
| | | | 280/270 |
| 2017/0096183 A1* | 4/2017 | Bales | B62K 21/10 |

* cited by examiner

BICYCLE CABLE-WRAP PREVENTION DEVICE

FIELD

The present subject matter is directed in general, to a device for bicycle cables and more particularly, to a device designed for preventing bicycle cables from wrapping around a head tube component of a bicycle.

BACKGROUND

Many bicycles have one to four cables for operating brakes and gear systems. In my bicycle shop, I have many times seen bicycles brought into my shop for maintenance or other purposes having their cables wrapped around a head tube of a bicycle. This problem occurs for various reasons, "locks up" brakes and gears, and can damage the cables when a tension or strain imposed on the wrapped cables is greater than a predetermined value.

Because I could not find a solution to this problem in bicycle shops near mine, the prior art was investigated for guidance in solving this problem.

U.S. Pat. No. 10,065,695 to Melcher discloses a device to prevent a bicycle front wheel from turning. The device includes a clamp, a lever, and a receiver. The clamp (which is adjustable) is designed for removable coupling to a steering tube of a bicycle. The clamp, secured tightly around the steering tube, prevents rotation of the clamp around the steering tube. The lever, coupled to the clamp, is rotatable from vertical through horizontal an angel for contacting the receiver disposed on a cross bar or lower tube of a bicycle.

U.S. Pat. No. 9,475,539 to Ehrhard et al. discloses a bicycle handlebar steering stop comprising a first stop element adapted to be fixed to a head tube of a bicycle fork, and a second stop element cooperating with the first stop element to limit a steering angle. The second stop element is adapted to be mounted on a bicycle frame, particularly, to an upper tube of the frame.

U.S. Pat. No. 8,696,007 to Jankura et al. discloses a bicycle frame having a fork and handlebar. The frame includes a head tube, a bottom bracket adapted to support a crankset, and a lower tube coupled between the head tube and the bottom bracket. The frame also includes a fork bumper coupled to and disposed on an underside of the lower tube. The bumper, extending outwardly from the lower tube, includes a base and a resilient outer layer engageable by the fork to prevent contact between the lower tube and fork.

U.S. Pat. No. 6,631,915 to Barefoot discloses a device to limit maximum extension of a fork, to permit the fork to function as a shock-absorbing unit. The device includes a rod-like ratchet with teeth along a side thereof for operatively engaging an upper member of a leg of the fork. A shuttle, slidably mounted to a neutral shaft mounted on a lower member, contains two pawls that engage or disengage from the teeth based on a rotational position of the rod-like ratchet. A coil spring biases the shuttle upwardly toward the ratchet.

U.S. Pat. No. 6,003,890 to Inouye discloses an assembly for preventing rotation of a bicycle fork into engagement with the frame of a bicycle. The assembly includes at least one catch surface on the frame and a pin on the fork. Upon rotation of the fork beyond a predetermined position, the pin engages the catch surface and further rotation of a bicycle fork is prevented.

U.S. Pat. No. 4,887,827 to Heggie discloses a device for a bicycle. This device, designed for a bicycle frame lower cross bar, is adapted to be engaged by the bicycle front wheel fork shoulder to limit the front fork from turning so far to the left or right as to be at a right angle to the forward movement of the bicycle which can cause a bicycle to jackknife while being ridden. The device includes a pair of clamps that surround the lower cross bar. The clamps are capped by two plates. A pair of bolts secure plates and clamps together. The bolts also hold a striker plate which the front fork shoulder contacts after the front fork turns through an arc of 35-45 degrees. When contacting the striker plate, the fork is prevented from turning further.

Since the prior art I reviewed, analyzed, and described does not disclose or even suggest a solution to the problem I have seen in my shop, and since it is clear there is still a need for a device to prevent bicycle cables from wrapping around a steering tube, my solution is summarized as follows.

SUMMARY OF THE INVENTION

The present subject matter, designed to be attached to a steering tube of a bicycle, prevents bicycle cables from wrapping around a head tube of a bicycle. The device includes an arm and a stop. The arm has a proximate end portion and a distal end portion. The proximate end portion is secured to a steering tube of the bicycle. The distal end portion is secured to the stop. The stop permits rotation of the steering tube about an axis of rotation relative to the head tube only between a first position and a second position, and the result prevents bicycle cables from wrapping around the head tube.

BRIEF DESCRIPTION OF THE FIGURES

Throughout the FIGS. and the detailed description, similar reference numerals shall be used for similar components of the present subject matter.

DETAILED DESCRIPTION

Figure 1:
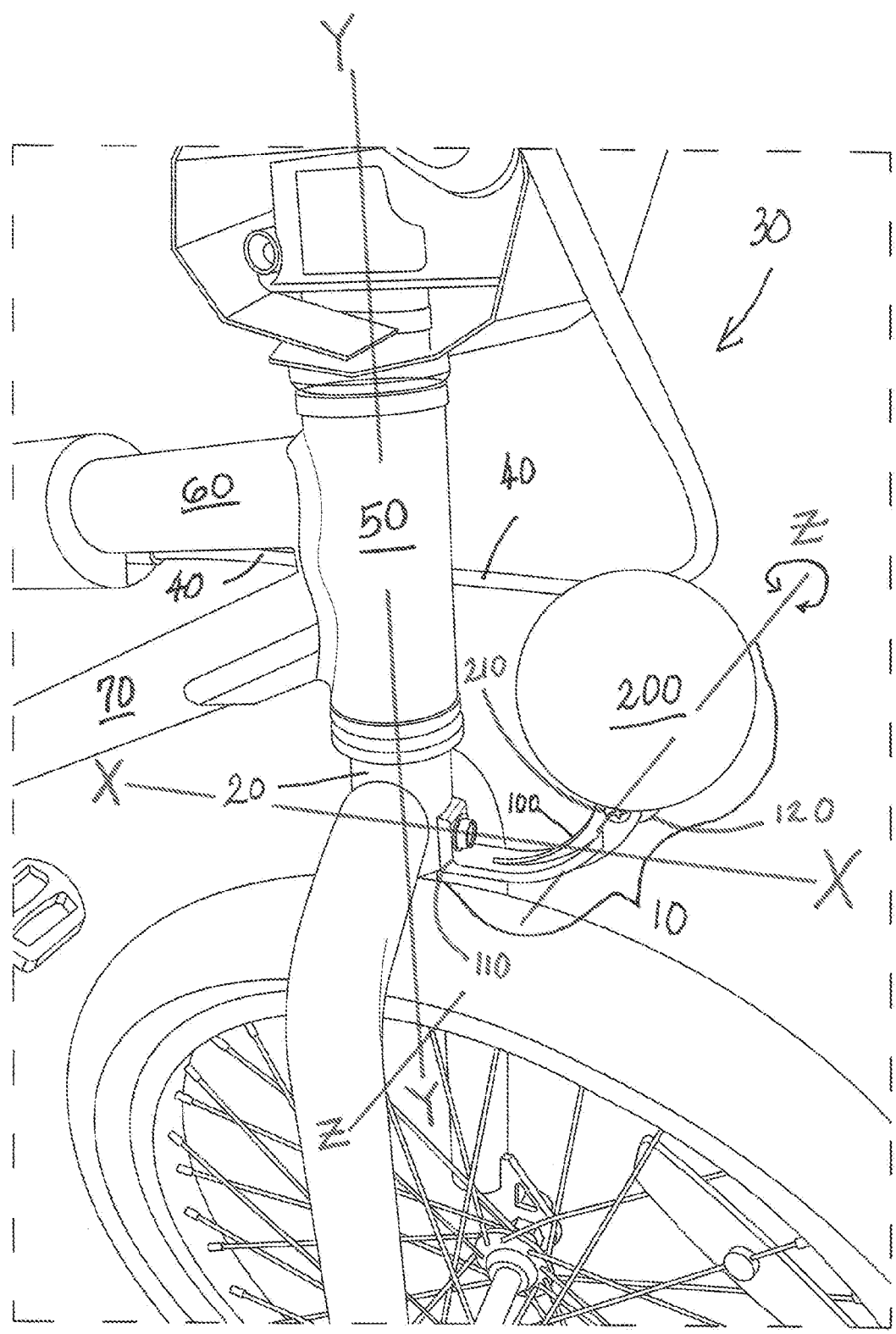
FIG. 1 is a partially fragmented perspective view of a bicycle having a steering tube component, showing an embodiment of the present subject matter removably secured to a lower portion of the steering tube component.
Figure 2:
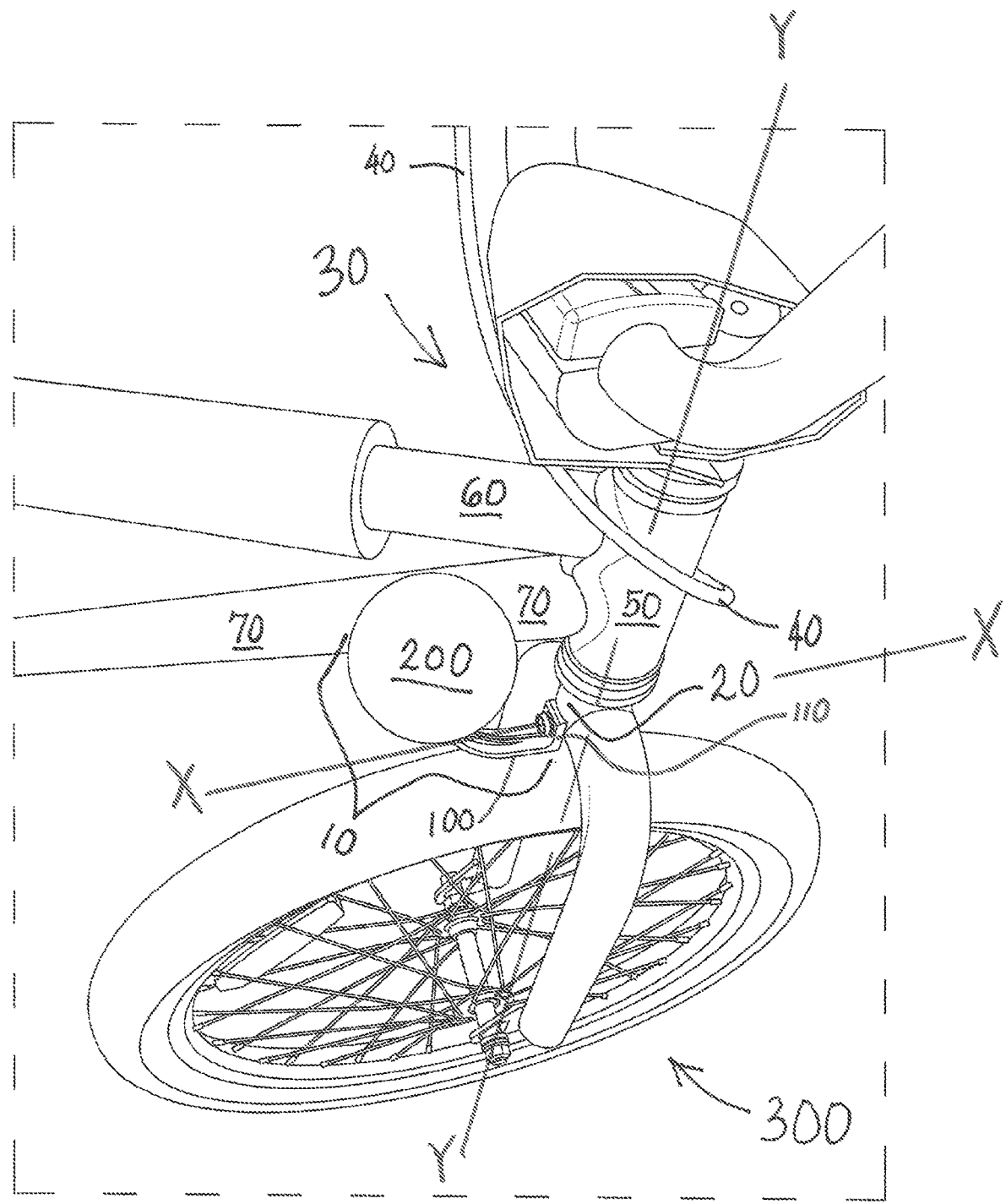
FIG. 2 is a partially fragmented perspective view of a bicycle having a down (or lower) tube, showing a component of the present subject matter abutting the down tube on its right side relative to a normal direction of travel.
Figure 3:
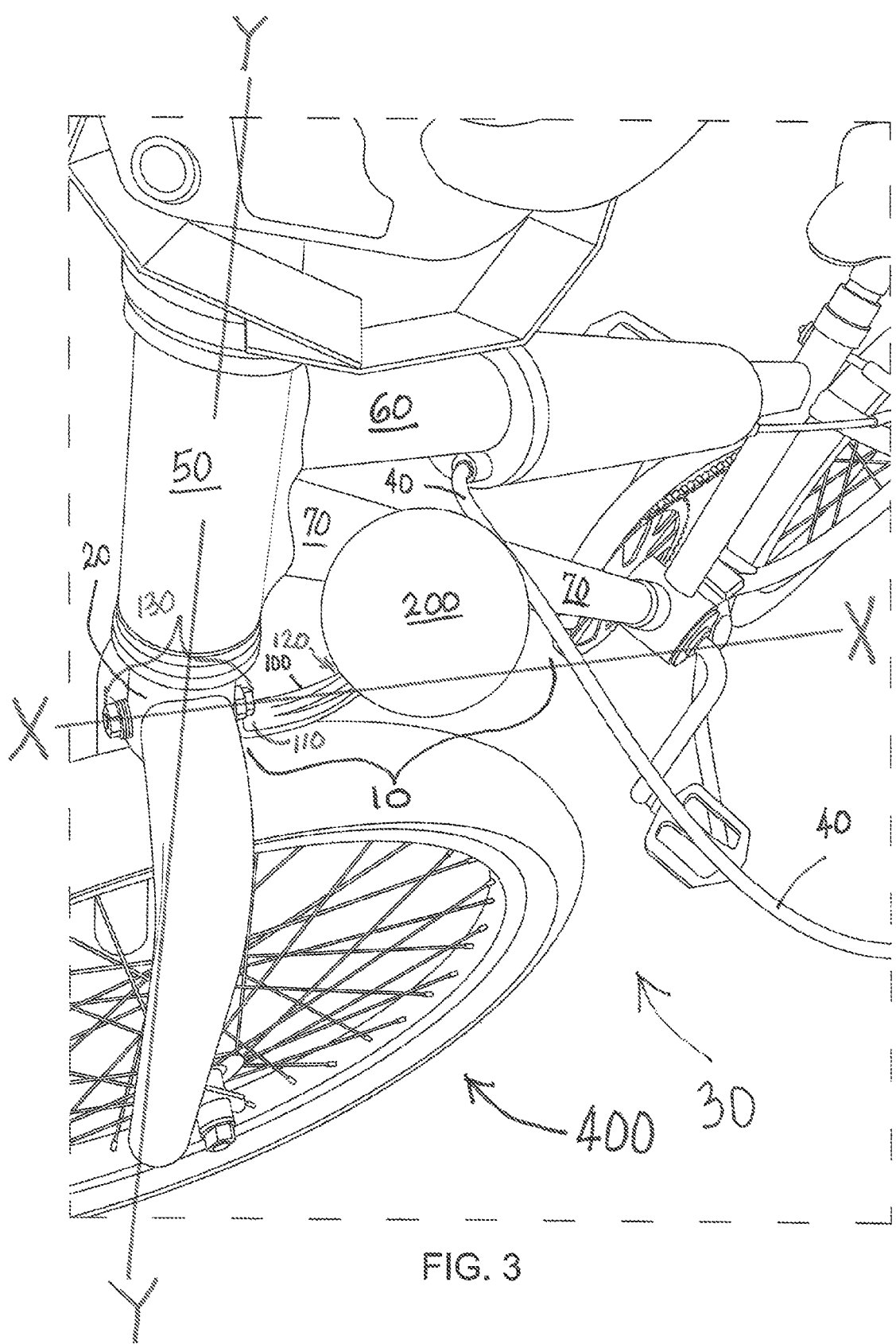
FIG. 3 is a partially fragmented perspective view of a bicycle having a down (or lower) tube, showing a component of the present subject matter abutting the down tube on its left side relative to a normal direction of travel.

Turning now to FIGS. 1-3, I shall now describe the present subject matter—my invention—in detail. The present subject matter is directed to a device 10 for attachment to a steering tube 20 of a bicycle 30 for preventing bicycle cables 40 (only one of which is shown) from wrapping around a head tube 50 of the bicycle 30. The bicycle 30 includes a top (or upper) tube 60 and a bottom (or lower) tube 70 joined (usually welded) to the head tube 50.

For the bicycle 30, a normal direction of travel is from left-to-right in FIGS. 1, 2 and from right-to-left in FIG. 3. For the illustrated embodiment of the present subject matter, the device includes an arm 100 and a stop 200.

The arm 100 has a proximate end portion 110 and a distal end portion 120 spaced from the proximate end portion 110. The proximate end portion 110 of the arm 100 is removably secured to the steering tube 20 by a threaded fastener mechanism 130 which includes a machine screw of predetermined length, a nut having internal treads that mate with the threads of the machine screw, and washers (which include at least one spline or "lock washer") between the nut and the steering tube 20, as illustrated by FIG. 3.

The arm 100 and distal end portion 120 extend curvilinearly outwardly from the steering tube 20 along a first axis X-X. The head tube 50 includes a hollow cylindrical interior (not shown), and the steering tube 20 is rotatably disposed about a second axis Y-Y through the hollow interior of the head tube 50. The second axis Y-Y is disposed transverse to the first axis X-X.

The stop 200, dimensioned and configured to abut the down (or lower) tube 70, is removably secured to the distal end portion 120 by a threaded fastener 210. The treaded fastener 200, when loosened, enables the stop 200 to be adjustably pivotable about a third axis Z-Z defined by the treaded fastener 210, to enable the stop 200 to be oriented so that a preselected portion of the stop 200 abuts a preselected portion of the lower tube 70 on its right and left sides, relative to the normal direction of travel of bicycle 30.

The stop 200 permits rotation of the steering tube 20 only between a first position 300 (FIG. 2) and a second position 400 (FIG. 3), for preventing bicycle cables 40 from wrapping around the head tube 50 of the bicycle 30.

As a result, the stop 200, by abutting the down (or lower) tube 70, prevents cables 40 from wrapping around the head tube 50, which otherwise could occur when a bike is, e.g., loaded onto a vehicle and the steering tube 20 inadvertently spun 360 degrees or more (from a position used for normal direction of travel) which locks up brakes and gears and damages cables 40. A stop 200 is designed to have any shape and/or size so long as its design prevents cable wrap in accordance with the present subject matter. Also, to prevent damage to an exterior surface finish of a down or lower tube 70, a stop 200 is manufactured of synthetic materials having physical properties that would cause virtually no damage to an exterior surface finish of a down or lower tube 70 of a bike 30. A stop 200 can, e.g., be a spherical tennis ball.

To meet the mandate of 35 USC 112 and identify bicycle components shown in FIGS. 1-3, but not described in this specification, the disclosure of each US patent discussed above is incorporated by reference in its entirety.

What has been illustrated and described is a device for preventing bicycle cables from wrapping around a head tube component of a bicycle. While the present subject matter is described in relation to a single embodiment, the present subject matter is not to be limited. On the contrary, many alternatives, changes, and/or modifications will become apparent to a person of ordinary skill in the art (POSITA) after this patent specification and its figures has been fully reviewed. Therefore, all such alternatives, changes, and/or modifications are to be viewed as forming a part of the present subject matter insofar as they fall within the spirit and scope of the appended claims.

I claim:

1. A device (10) for attachment to a steering tube (20) of a bicycle (30), wherein the device (10) is configured for preventing bicycle cables (40) from wrapping around a head tube (50) of the bicycle (30), wherein the bicycle (30) includes an upper tube (60) joined to the head tube (50) and further includes a lower tube (70) joined to the head tube (50), wherein the device (10) comprises:

an arm (100) having a proximate end portion (110) removably secured to the steering tube (20) and a distal end portion (120) spaced from the proximate end portion (110), wherein the distal end portion (120) extends away from the steering tube (20) along a first axis (X-X), wherein the head tube (50) defines a hollow interior; and a stop (200) secured to the distal end portion (120) of the arm (100) wherein the stop (200) comprises a spherical object the size of a tennis ball, wherein the exterior surface of the spherical object is a synthetic material to prevent damage to the exterior surface finish of the bicycle, wherein the steering tube (20) is rotatably disposed about a second axis (Y-Y) through the hollow interior of the head tube (50), wherein the second axis (Y-Y) is disposed transverse to the first axis (X-X), wherein the stop (200) is configured to abut the lower tube (70) either at a first position (300) or at a second position (400), wherein the first position (300) is spaced from the second position (400), whereby the stop (200) permits rotation of the steering tube (20) about the second axis (Y-Y) only between the first position (300) and the second position (400), thereby preventing bicycle cables (40) from wrapping around the head tube (50) of a bicycle (30).

2. The device (10) of claim 1, wherein the arm (100) is removably secured to the steering tube (20) by a threaded fastener mechanism (130).

3. The device (10) of claim 1, wherein the lower tube (70) is welded to the head tube (50).

4. The device (10) of claim 1, wherein the stop (200) comprises a tennis ball.

5. The device (10) of claim 1, wherein the arm (100) extends outwardly from the steering tube (20) in a curvilinear manner along the first axis (X-X).

6. The device (10) of claim 1, wherein the stop (200) is removably secured to the distal end portion (120) of the arm (100) by a threaded fastener (210) having a length.

7. The device (10) of claim 6, wherein the threaded fastener (210) is configured for enabling the stop (200) to be pivotably adjustable about a third axis (Z-Z), wherein the third axis (Z-Z) is oriented along the length of the threaded fastener (210), and wherein the third axis (Z-Z) is oriented transverse to the first axis (X-X) and to the second axis (Y-Y).

8. The device (10) of claim 7, wherein the threaded fastener (210) is further configured for enabling a first preselected portion of the stop (200) to abut a first preselected portion of the lower tube (70) on its right side and for enabling a second preselected portion of the stop (200) to abut a second preselected portion of the lower tube (70) on its left side when the stop (200) is rotated about the second axis (Y-Y) between the first position (300) and the second position (400).

* * * * *